US012421787B2

(12) United States Patent
Mazreku

(10) Patent No.: US 12,421,787 B2
(45) Date of Patent: Sep. 23, 2025

(54) CLOSURE WITH VALVE DEVICE

(71) Applicant: VERANDA PLUS e.K., Nettetal-Kaldenkirchen (DE)

(72) Inventor: Bekim Mazreku, Kaldenkirchen (DE)

(73) Assignee: VERANDA PLUS e.K., Nettetal-Kaldenkirchen (DE)

( * ) Notice: Subject to any disclaimer, the term of this patent is extended or adjusted under 35 U.S.C. 154(b) by 286 days.

(21) Appl. No.: 18/033,823

(22) PCT Filed: Oct. 27, 2021

(86) PCT No.: PCT/EP2021/079810
§ 371 (c)(1),
(2) Date: Apr. 26, 2023

(87) PCT Pub. No.: WO2022/090307
PCT Pub. Date: May 5, 2022

(65) Prior Publication Data

US 2023/0399887 A1 Dec. 14, 2023

(30) Foreign Application Priority Data

Oct. 28, 2020 (DE) ..................... 20 2020 106 177.1

(51) Int. Cl.
*E06B 5/16* (2006.01)
*E06B 3/70* (2006.01)
*E06B 5/12* (2006.01)

(52) U.S. Cl.
CPC ................ *E06B 5/162* (2013.01); *E06B 3/70* (2013.01); *E06B 5/125* (2013.01); *E06B 2003/7046* (2013.01); *E06B 2003/7057* (2013.01)

(58) Field of Classification Search
None
See application file for complete search history.

(56) References Cited

U.S. PATENT DOCUMENTS 3,314,703 A * 4/1967 Fitzpatrick .......... E05B 65/1006 292/29
3,345,099 A * 10/1967 Paul .................... E05B 65/1013 292/224
(Continued)

FOREIGN PATENT DOCUMENTS

CN 106703649 A 5/2017
CN 109488179 A * 3/2019
(Continued)

*Primary Examiner* — Catherine A Kelly
(74) *Attorney, Agent, or Firm* — Smartpat PLC

(57) ABSTRACT

A closing body allows closing and opening an access opening or a passage of a room in case of a pressure difference between an interior and exterior of the room. A closing fitting set and a door leaf are disclosed, by means of which closing fitting set and door leaf a closing body can be formed. The closing body is in the form of a pivotable door, a pivotable window or a pivotable flap. A valve device is provided on the closing body, which valve device effects a temporary pressure equalization during the opening or closing of the closing body. The valve device is in the form of a valve flap, and a release mechanism is provided, which opens the valve device. A locking fitting is provided for the closing body, and the release mechanism is coupled, for actuation, to the locking fitting of the closing body.

28 Claims, 9 Drawing Sheets

(56) References Cited

U.S. PATENT DOCUMENTS

| | | | | | |
|---|---|---|---|---|---|
| 3,705,739 | A * | 12/1972 | Adler | E05B 65/104<br>292/207 |
| 4,210,349 | A * | 7/1980 | Cook | E05F 5/027<br>292/201 |
| 5,927,012 | A * | 7/1999 | Cermola | A62C 2/24<br>49/7 |
| 6,282,929 | B1 * | 9/2001 | Eller | E05C 9/026<br>70/109 |
| 8,985,644 | B2 * | 3/2015 | Manny | E05B 51/02<br>292/164 |
| 9,670,697 | B2 * | 6/2017 | Takahashi | E06B 5/00 |
| 11,851,925 | B2 * | 12/2023 | Bogdanov | E05B 47/0673 |

FOREIGN PATENT DOCUMENTS

| | | | | | |
|---|---|---|---|---|---|
| CN | 112431531 | A | * | 3/2021 | |
| DE | 1148468 | B | | 5/1963 | |
| DE | 2739034 | A1 | | 3/1978 | |
| DE | 3912740 | C1 | * | 6/1990 | E05F 3/223 |
| DE | 19812319 | A1 | * | 9/1999 | |
| DE | 19937532 | A1 | | 2/2001 | |
| DE | 19812319 | B4 | | 9/2009 | |
| EP | 1835969 | A1 | | 7/2006 | |
| EP | 2050908 | A1 | * | 4/2009 | E05C 19/024 |
| EP | 2337912 | A1 | | 4/2010 | |
| EP | 2813660 | A1 | | 12/2014 | |
| EP | 3536887 | A1 | | 9/2019 | |
| JP | H04102691 | A | | 4/1992 | |
| JP | H07259407 | A | * | 10/1995 | |
| JP | 2010174502 | A | * | 8/2010 | |
| JP | 2019044576 | A | | 3/2019 | |
| KR | 20040081724 | A | | 9/2004 | |
| KR | 101904853 | B1 | * | 10/2018 | |
| KR | 101932620 | B1 | * | 12/2018 | |
| KR | 20190024759 | A | | 3/2019 | |
| WO | WO-2015117177 | A1 | * | 6/2015 | |
| WO | 2015128841 | A1 | | 9/2015 | |

* cited by examiner

R
2,2a
3
16
P+
P
F
10
32
V

R
4
2,2a
16
P
P+
F
V
32
10

CLOSURE WITH VALVE DEVICE

CROSS-REFERENCE TO RELATED APPLICATION

This application is a national stage application, filed under 35 U.S.C. § 371, of International Patent Application PCT/EP2021/079810, filed on Oct. 27, 2021, which claims the benefit of German Patent Application DE 20 2020 106 177.1, filed on Oct. 28, 2020.

TECHNICAL FIELD

The present disclosure relates to a closing body, in particular a door, a window or a flap, for closing and opening access openings or passages of a room, wherein a pressure difference exists between the interior and the exterior of the room. An essential innovation according to the disclosure is that a valve device is provided on the closing body, which effects a temporary pressure equalization when opening the closing body.

The disclosure relates in particular to a fire door. In particular, the room is an escape route room of a civil building, further in particular a stairwell.

The disclosure further relates to a closing fitting set and a door leaf, which can be used individually or together to form the closing body.

BACKGROUND

The closures known in practice (locking techniques for access openings or room passages of rooms) are not optimally usable in a situation in which there is a pressure difference between the interior and exterior of the room, which are separated from each other by the closure. This shows with particularly negative consequences in the event of fire.

Escape routes in buildings can comprise several rooms separated by closing bodies and must ensure safe escape for at least 90 minutes in the event of fire.

To achieve this goal, smoke pressure systems (SPS) pressurize escape route rooms, especially stairwells in buildings. The smoke pressure systems are automatically switched on by smoke sensors. The smoke pressure systems constantly force fresh air into the escape route room and generate an overpressure in it compared to adjacent rooms (usable areas). This prevents (further) smoke from the adjacent room from entering the escape route room or the stairwell. Furthermore, smoke already accumulated in the escape route room is preferentially displaced upwards. Closing bodies, such as doors, which close the entrances or access openings to and from the escape route room or the stairwell, should have a door opening force of 100 N according to a relevant standard. A door opening force of 100 N is already so high that younger people cannot muster it without doubt.

On the other hand, an air velocity of 2 m/s must be ensured in the door cross-section when a door of the escape room is opened.

The door opening force that a person has to apply to open the door is made up of the force of the overhead door closer and the force resulting from the pressure on the door leaf (pressure difference force). For conventional doors with an area of approx. 2 square meters, the pressure in the escape route is therefore limited to 30-40 Pa (Pascal). However, this pressure is often not sufficient to achieve the required 2 m/s in the door cross-section. Therefore, in practice, significantly higher pressures occur in the escape route. Thermal effects can also cause the pressure in the escape route to be far above the specified 30-40 Pa, at least locally, which leads to correspondingly higher pressure difference forces on the doors.

In most cases, the doors of the usable areas on upper floors open towards the stairwell. If, for example, a door is opened between a useable area on an upper floor and the stairwell, the door must be opened against the overpressure in the stairwell, wherein the door opening force can be far above the intended limit of 100 Newtons and can correspond to up to 2000 Newtons because of the pressures actually occurring in practice. Such a door opening force can often not be applied by a single person.

While fire safety standards specifically prescribe a maximum opening force only for doors, it would be desirable that other closing bodies such as windows or flaps that can close an access opening or passage to an escape route room also be operated with appropriately low opening forces in an emergency so as not to present a barrier to escape. Because it cannot always be predicted through which access opening or passageway an attempt to escape will be made.

The situation is similar, for example, in clean rooms in industry, laboratories or hospitals. Here rooms are also often pressurized so that no dust, germs or the like can enter the rooms. The doors of these rooms also cannot be opened easily due to the pressure.

DE 27 39 034 A1 discloses a door closing system in which a door is held in the position in which it was last open until a control signal is received from either a detector arrangement or a current interrupt switch. The door may also be manually closed by a person pressing against the door with sufficient force to initially overcome the restraining force of a door closer. After the force is overcome and the door begins the closing process, the door closer will close the door the rest of the way.

DE 19937 532 A1 describes an arrangement for the setting of a pressure difference between an escape route in a building and its surroundings. The arrangement comprises an outflow opening which connects the escape route with the environment and whose flow resistance can be varied by means of a preferably electrical actuator. Furthermore, a pressure sensor is provided in the escape route, which measures the pressure at a point in time at least in the escape route. A control device is also provided in the arrangement, which has an input for the signal of the pressure sensor and an output for the actuator. The pressure sensor is connected to with the input of the control device via a signal line and the actuator is connected to the output of the control device via a control line. The control device is configured in such a way that it generates a control signal for the actuator, if the measured pressure difference reaches and/or exceeds a defined, preferably preset threshold pressure difference.

EP 1 835 969 B1 discloses a mobile smoke and fire protection device in buildings for installation in the event of a fire, with a sealing unit that can be attached in or on an opening in a wall, ceiling or floor. The shape and size of the sealing unit is adapted to the opening and is at least partially provided with a flexible material. The passage opening is intended for persons and/or provided with a passage opening for equipment, firefighting equipment and the like. The passage opening and/or the passage opening for equipment can be at least partially covered. The sealing unit is provided with a tension or clamping frame.

DE 1 148 468 B discloses a combined drive device for two pivoting door panels that are motorized and arranged at the ends of an anteroom for a gas-tight lockable room of a nuclear reactor. Each of the door panels comprises a pressure equalization valve, which is designed as a cone plug. The doors can only be moved in a coordinated manner, so that at any time at least one of the doors is gas-tight closed. A separate push-button arranged in the room triggers the closure of one door, the closure of the valve there and subsequently the opening of the other door. Before opening the other door, the valve there is also opened, thereby bringing about a permanent pressure equalization.

Another special door for nuclear facilities is described in DE 198 12 319 A1.

EP 2 337 912 B1 describes a high-rise building with a stairwell, an air supply shaft, inlet openings that connect the air supply shaft with the stairwell, and a pressure system for smoke-free maintenance of the stairwell. Tables show how much the actual pressures in the stairwell can vary due to the stack effect. To solve the associated problems, the stairwell is vertically divided into multiple compartments by at least one bulkhead. Each bulkhead has a door that allows passage from one compartment of the stairwell to the adjacent compartment. This achieves a more homogeneous pressure maintenance in the event of a fire, especially for relatively tall high-rise buildings, for example, above 120 m in total height, at least over approximately 60 m, and thus limits the door opening force to standard values. In this case, a flow rate according to the standard, for example, greater than or equal to 2 m/s, between the stairwell and the use unit on the fire floor should be guaranteed. The stack effect for normal building operation and for fire situations does not have to be considered.

On the other hand, there is the problem that doors or other closing bodies of rooms or escape routes, which are particularly under pressure for smoke extraction, can swing dangerously when opened. This is especially true when the door opens away from the room under overpressure. In this case, a person who operates such a door (from the outside) in an emergency can quickly get injured.

SUMMARY

A purpose of the innovation is to avoid the disadvantages of the prior art and to create a closing body such as a door, window or flap, which can be opened as evenly as possible even when there are pressure differences above the closed closing body or between the closed closing body and the interior or exterior of the escape route room. It is also an object of the innovation to show a corresponding closing fitting set as well as a corresponding door leaf.

According to the innovation, the problem is solved by providing a valve device on a closing body for closing and opening access openings or passages of a room of the type mentioned above, which effects a temporary pressure equalization when opening the closing body.

The valve device is preferably designed to be passive with regard to the opening movement. This means that the opening movement occurs without the support of a drive or a preloading means. The valve device causes a temporary pressure equalization depending on the requirements.

The release mechanism releases an opening of the valve device. Whether the opening actually takes place may depend on external conditions, in particular whether there is actually a sufficiently high pressure difference. This avoids unnecessary openings of the valve device if there is no need for them.

The opening movement of the valve device is preferably caused by a pressure difference force resulting from the pressure difference between the interior and exterior room. The opening movement may in particular be caused exclusively by the pressure difference force.

The valve device can further preferably designed to be active with regard to the closing movement. This means that the closing movement can be supported by a drive. The at least one drive can be a flap closer. Furthermore, the closing body may have an additional closing device.

The valve device is preferably self-closing. This means that the closing of the valve device is initiated when and especially as soon as a pressure difference force has dropped to a certain level, in particular to a level that is smaller than the forces acting in the closing direction of the at least one drive.

The innovation is based on the principle that the temporary pressure equalization by means of the valve device no longer leads to an overloading of the door opening force or to a forceful impact of the closing body due to the pressure. Rather, the valve device and the allowed pressure equalization temporarily reduce a pressure difference force to enable unobstructed escape.

In a preferred further embodiment, the valve device is closed again by the innovation after the escape has taken place, so that the pressure difference can build up again.

The closing body opens a valve device arranged in the door leaf when actuated, so that pressure equalization occurs quasi-simultaneously with the door opening or with minimal time delay. This eliminates the force resulting from pressure and the closing body can be opened largely independently of the pressure difference. This allows a smoke pressure system to be operated, for example, with higher pressure, which improves fire safety without creating an obstacle for escaping persons. With higher pressure, a speed of 2 m/s is regularly achieved in the door cross-section, thus improving fire safety.

Such a closing body can be used both with positive pressure and negative pressure.

Doors, windows, or flaps regularly form the bodies with which escape routes are closed. In this respect, an advantageous embodiment of the novel closing body is that the closing body is designed as a pivoting door, pivoting window, or pivoting closure.

Another advantageous embodiment of the novel closing body is that a locking fitting, in particular a mechanical, electronic, pneumatic, and/or hydraulic locking fitting, is provided for the closing body. With such fittings, the locking of closing bodies can be realized in a suitable manner. Sometimes, such locking fittings also allow external control of the locking mechanism. With a control unit that is designed, for example, as a processor-controlled unit, such a locking fitting can be actuated, for example, to release or execute or prevent an opening movement or closing movement. Furthermore, the required force can be applied to lock the closing bodies with such systems.

Correspondingly, the valve device can also be designed to be controlled in a suitable manner. In one embodiment of the novel closing body, a release mechanism is preferably provided, in particular a mechanical, electronic, pneumatic and/or hydraulic release mechanism, which opens and, if necessary, closes the valve device. The release mechanism can be designed in particular to open or close the valve device as required, i.e. in particular only when a sufficiently high pressure difference is present. In other words, the release mechanism can be designed to only open the valve device when the pressure difference exceeds a threshold value.

In a further advantageous embodiment of the novel closing body, the release mechanism is operatively coupled to the locking fitting of the closing body. The operative coupling means that an actuation of the locking fitting, for example, the manual movement of an actuation pawl or the controlled activation of an actuator of the locking fitting, is converted via the release mechanism into a coupled opening of the valve device. In other words, when the locking fitting is actuated, the valve device is automatically opened through the operative coupling. There is no need for a separate additional actuation to open the valve device. In case of an emergency, a person attempting to escape does not need to activate a separate opening means to reduce the pressure difference across the closing body. Instead, this occurs automatically due to the operative coupling with the locking fitting.

The closing body comprises at least two latches, a first latch which holds the closing body in a closed state with respect to a frame, and a second latch which holds the valve device in a closed state with respect to the closing body. The release mechanism, and in particular the preferably used mechanism, opens these two door latches, one to open the door and a second to release the valve device, such as the flap. The flap preferably only opens in case of overpressure. The flap also preferably closes automatically in the event of a pressure drop, thus complying with fire and smoke protection regulations.

Another advantageous embodiment of the novel closing body is that a pressure sensor is provided which controls the release mechanism. The release mechanism reacts to the control signals generated by a pressure sensor. This allows the valve device to be actuated when the pressure, for example in the pressurized room, becomes too high and exceeds a predetermined threshold.

Another advantageous feature of the novel closing body is that the release mechanism includes a means, particularly a control means, which opens the valve device temporally before the closing body. The control means can be of any design. For example, it can be formed by a gear that causes a second latch, which secures the valve device, to open earlier than a first latch that secures the locking device when the actuating pawl is moved. Such a gear can be connected between a thrust body, through which the second latch is moved, and a locking fitting of the closing body. Alternatively or additionally, the means can be formed by designing the first and second latches with different (effective) tongue lengths, so that at essentially the same movement speeds, the second latch reaches the release threshold earlier than the first latch.

Since pressure equalization should take place before the closing body is released, or at most at the same time, the means is provided that first performs pressure equalization before the closing body is allowed to open. This can be done, for example, by delaying the release of the locking fitting. Initially, the valve device for pressure equalization is actuated before the closing body is allowed to open.

Further embodiments and advantages arise from the subject matter of the dependent claims and the drawings with the corresponding descriptions. Various exemplary embodiments are explained in more detail below with reference to the accompanying drawings.

The invention should not be limited solely to the exemplary embodiments mentioned. They merely serve to explain the invention in more detail. The present invention is intended to relate to all objects which now and in the future the person skilled in the art would consider obvious for the realization of the invention.

Aspects of the invention are shown schematically and exemplarily in the drawings.

DETAILED DESCRIPTION

Figure 1:
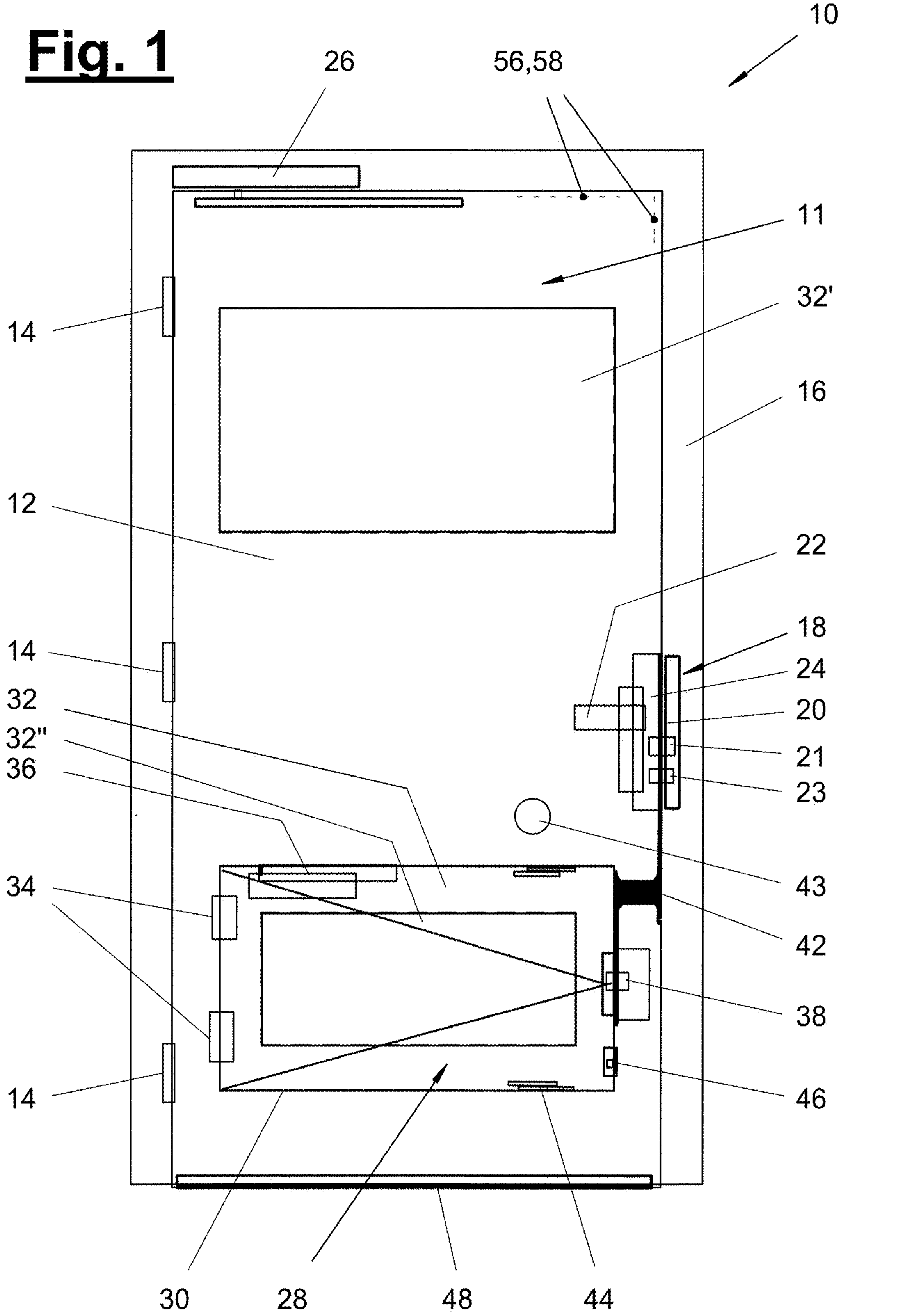
FIG. 1 is a schematic diagram of a closing body, which is designed as a door with a valve device.

In FIG. 1 is referenced by numeral (10) a closing body. The closing body (10) is formed by a door (11). The example of the door (11) represents the most common implementation expected in practice and is representative of the other possible embodiments of the closing body (10), in particular a window (9) or a flap. For reasons of simplicity, the invention is explained below using the example of door (11). It is known to those skilled in the art that the components intended for a door, such as locking fittings, door locks, hinges, door frames, etc., can be present in a corresponding manner in windows and flaps as well as other pivotable closing bodies, for example as window locks, hinges, and window frames, or as flap locks, hinges, and flap frames. In the following, no differentiation will be made between the terms door leaf and window leaf or flap leaf as well as door lock and window lock or flap lock. The terminologies used for the example of the door (11) also apply to functionally equivalent components of a window and a flap.

The door (11) comprises a door leaf (12), which is pivotally attached to a door frame (16) via hinges (14). Thus, the term "door leaf" refers to any movable main part of the closing body (10) that opens or closes the access opening to the room under pressure.

The door leaf (12) can positively close the door frame (16), so that in the closed state, no air or smoke (8) can pass through this door (11). The door frame (16) is anchored in a passage of a masonry, not shown here. A locking fitting (18) contains in the example of FIG. 1 a door lock (20) with an actuating pawl (22). The actuating pawl (22) can have any physical design. It can be designed as a rotatable handle (door handle, window handle, etc.) in the illustrated form. Alternatively or additionally, it can be designed as a panic bar, push bar or rotary knob. Alternatively or additionally, the actuating pawl (22) may include an actuator or be connected to an actuator, which is activated by a control means. The control means can be of any kind, for example a door-opening switch, which is arranged on or near the door, or a building control system.

The door lock (20) is preferably a panic lock (24), which can be opened at any time from one side, usually from the inside of a usable area (3) of a building (1). From the other side, the panic lock (24) can be lockable, but this is optional. The ability to open from one side ensures that access to the escape route room or throughway can be released at any time by operating the closing body from one side, even if the panic lock (24) could not be opened from the other side. This ensures an escape route through the door (11) to the outside at all times. In other words, a panic lock (24) can always be opened from exactly one side of the closing body (10) to release an escape route, especially an escape route to the stairwell (2*a*) of a building (1). The ability to open from the other side of the closing body (10) can be temporarily released or blocked.

The door (11) is automatically closed by a spring-loaded door closer (26). The door closer (26) is preferably attached to or integrated into the closing body (10). Alternatively, the door closer (26) can be attached to the door frame (16). Alternatively, the door closer (26) can be integrated into a hinge (14) of the closing body (10). The term "spring-loaded" includes any energy storage techniques approved for door closure (such as window or flap closure) on escape routes, such as mechanical springs, gas springs, or systems for storing potential energy.

At the lower end of the door leaf (12) there is a mechanical valve device (28). For this purpose, an opening (30) is provided in the door leaf (12), which is opened or closed with the valve device (28). The valve device (28) comprises a valve flap (32), which is pivotally arranged on the door leaf (12) with hinge straps (34). In the example of FIG. 1, the hinge straps (34) are arranged on the outside of the door leaf (11) and the valve flap (32). Alternatively, the hinge straps (34) can be integrated into the valve flap (32) or into the opening gap between the valve flap (32) and the opening (30), which is shown, for example, in FIGS. 11A and 111B.

A spring-loaded flap closer (36) preferably automatically closes the opening (30) with the valve flap (32) again. The flap closer (36) can have the same or a different design as the door closer (26). It can preferably be integrated into the valve flap (32) or the opening gap between the valve flap (32) and the opening (30) in the door leaf (11). Alternatively, the flap closer (36) can be integrated into the closing body (10) (cf. FIGS. 5A to 6C). Alternatively, the flap closer (36) can be integrated into a hinge strap (34) on which the valve flap (32) is pivotally mounted on the closing body (10).

A second latch, preferably designed in the form of a panic latch lock (38), secures the valve flap (32). The lock preferably acts in one direction so that the valve flap (32) only opens to one side. The opening direction (V) of the valve flap (32) is shown in various designs in the Figures, particularly in FIGS. 3 to 7.

A panic latch lock (38) preferably comprises a lock case (63), in or on which the second latch and any movement gear (not shown) are accommodated. The lock case can be inserted into a corresponding case receptacle (55).

The door lock (20), particularly the panic lock (24), can also comprise a lock case (19) and be insertable into a case receptacle of the door leaf (54).

The door lock (18), in particular the panic lock (24), and the panic latch lock (38) are preferably mechanically coupled to one another operatively via a release mechanism (42). They can be opened simultaneously or slightly delayed by means of a release mechanism (42). Preferably, the valve flap (32) opens first to establish pressure equalization. Alternatively, the operative coupling can be designed not mechanically, but for example electrically, hydraulically, or pneumatically.

The release mechanism (42) can also receive a signal from a pressure sensor (43), which controls the release mechanism (42) in a suitable manner for opening and closing.

A opening limiter (44) preferably allows only a defined opening range of the valve flap (32). This prevents the valve flap from opening too far and injuring a person standing in front of the door or causing other damage. Alternatively or additionally, the opening movement of the valve flap (32) can be damped by the opening limiter (44). The damping can be provided only in the opening direction, but not in the closing direction of the valve flap (32). The opening limiter (44) can have any design. It can be designed as a mechanical stop according to the example in FIGS. 1 and 5A to 6C and, for example, be arranged in the gap between the valve flap (32) and opening (30). Alternatively or additionally, the opening limiter (44) can be integrated into another element, for example, into the flap closer (36) or into a hinge strip (34).

A latching mechanism (46) locks the valve flap (32) so that it does not move unintentionally. The latching mechanism can have any design. The latching mechanism (46) can be a component of the release mechanism (42) and in particular cause or contribute to the valve device (28) opening or closing depending on the requirement, i.e., especially only when a sufficiently high pressure difference exists.

Figure 8A:
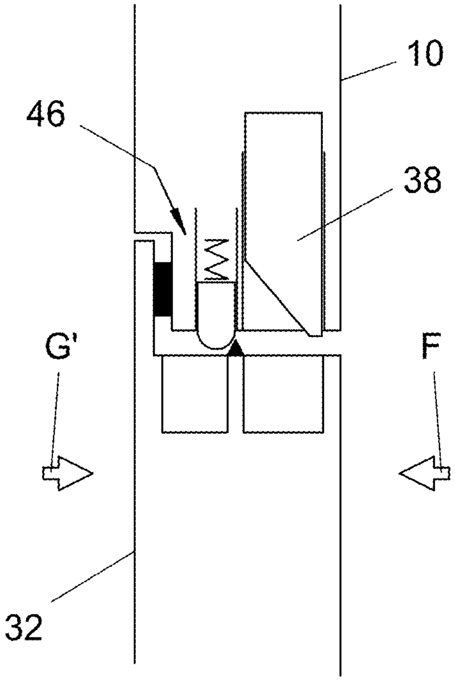
FIGS. 8A-8B are detailed views of a latching mechanism in an exemplary embodiment.
Figure 8B:
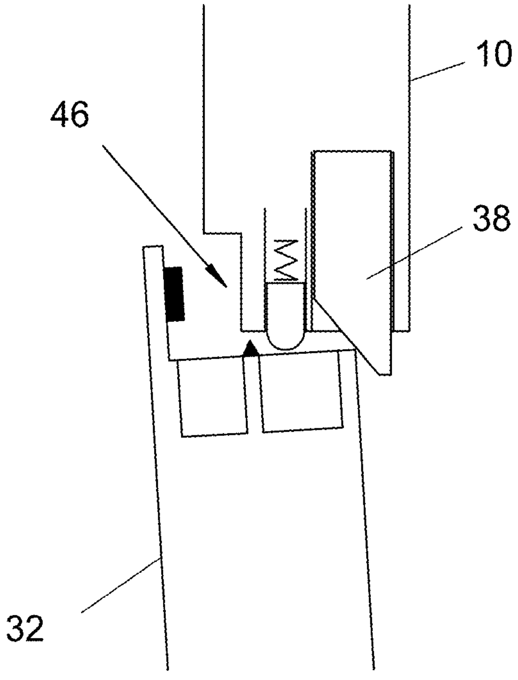

FIGS. 8A and 8B show a section view of the valve flap (32) and the closing body (10) with an exemplary design of a latching mechanism (46). The latching mechanism includes a spring-loaded element, for example, a rounded pin, which is pressed towards a counter body, for example, a latch nose. Alternatively, any other designs can be provided. The latching mechanism is arranged in such a way that it generates a limited counterforce that acts against the opening movement of the valve flap (32) and possibly the closing movement. This counterforce is called latching force (G'). It is preferably adjustable or controllable.

The latching force (G') is preferably chosen such that it only allows an opening movement of the valve flap (32) when the pressure difference above the closing body (10) exceeds a certain threshold. This can prevent the valve flap (32) from opening unintentionally, for example, due to inertial forces when the closing body (10) is operated swingingly.

In the example of FIG. 1, a retractable sealing rail (48) seals the door (11) so that no smoke (8) can penetrate through the gap between the floor and the door leaf (12). The closing body (10) and the valve device (28) can have various additional seals (58). Preferably, the closing body (10) has a fold (56), in particular a door fold, which overlaps the frame (16) in the closed state. Preferably, the valve flap (32) has a fold (57), in particular a flap fold, which overlaps the inner contour of the opening (30) in the closed state. A seal (58) is preferably arranged in the area of overlap of at least one fold (56, 57) (see FIGS. 1, 8, and 11).

Figure 2:
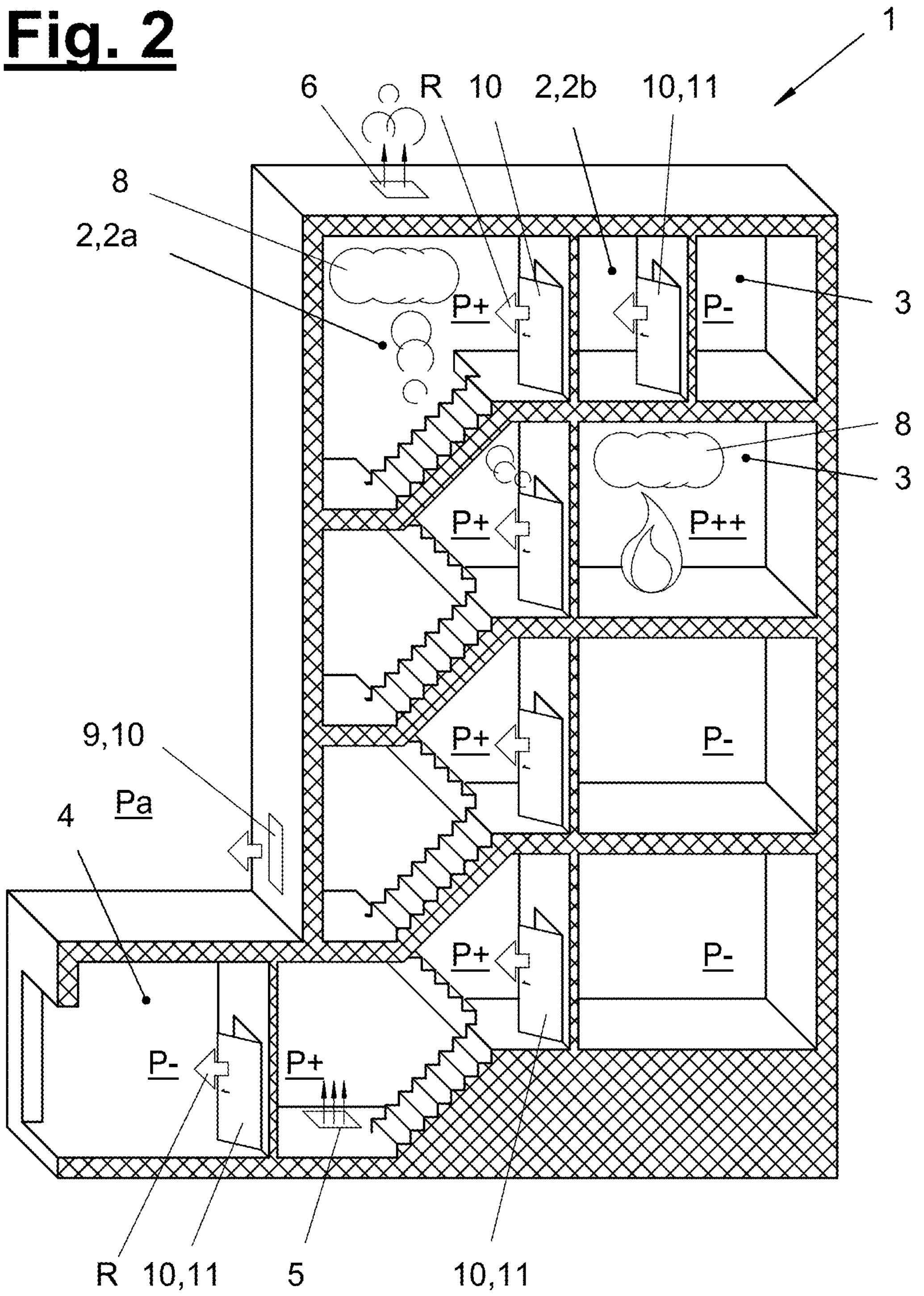
FIG. 2 is a schematic sectional view of a building in case of fire.

FIG. 2 shows an example representation of a building (1). The building (1) has several rooms (2) whose access openings or passages can be opened or closed by a closing body (10) according to the present disclosure. In the illustrated example, a fire (7) is located on the third floor in a usable area (3).

Several usable areas (3) are available from which people could escape via the stairwell (2*a*) and possibly via the lock (2*b*) in the top floor in the event of a fire. The escape route can lead towards the foyer (4). On the other hand, there may be other people trying to enter one of the usable areas (3) from outside through the stairwell (2*a*) and possibly through the lock (2*b*), for example, those attempting a rescue or firefighters trying to extinguish the fire.

The building has a smoke pressure system (5) designed to constantly bring fresh air into the stairwell (2, 2*a*) to generate an overpressure (P+). This means that the static pressure in the stairwell should be raised to a level that is at least a minimum threshold higher than the pressure level in the adjacent sections of the building, such as the foyer (4) or the usable areas (3). The pressure level in the stairwell (2*a*) should also be higher than the external atmospheric pressure (Pa).

In an alternative embodiment, the lock (2*b*) could also be under overpressure.

A lot of smoke (8) generated in case of a fire, which spreads in a room, particularly in an escape room such as the stairwell (2*a*). To remove the smoke (8), the room is pressurized to keep escape routes free of smoke.

The building (1) according to FIG. 2 comprises a controllable smoke and heat exhaust (6) in the upper area of the stairwell (2*a*). This can be a controllable flap whose opening cross-section is adjustable so that the incoming smoke (8) can escape, while the overpressure (P+) in the stairwell (2*a*) is maintained at a certain level.

In case of fire, all closing bodies (10) attached to access openings or passageways to the pressurized room (2) are usually closed. This is done particularly by door closers (26), which may be additionally controllable for this purpose. Furthermore, the locking fittings (18) of the closing bodies (10) can be designed to be controllable, for example, to retract the bolts (23) of the door locks (20)—if such are present. However, the first latches (21) of the door locks (20) usually remain in the extended position but may be switched softly so that the closing bodies (10) can be opened and closed again.

In the example of FIG. 2, all the doors shown in the upper floors adjacent to the stairwell (2*a*) and the lock (2*b*), as well as the door on the ground floor leading to the foyer (4), are part of the closing bodies (10) that close off access openings or passages to the pressurizable room (2). Furthermore, one or more windows or flaps may be present, which are designed as a closing body (10) according to the present disclosure. In the example of FIG. 2, a representative window is shown that can provide an exit to the roof above the foyer (4).

By moving the closing bodies (10) to the closed position, a closed volume is created in the stairwell (2*a*) (or in the lock 2*b*), so that a static overpressure (P+) can be generated and maintained by actuating the smoke pressure system (5) (even when the smoke and heat exhaust is controlled). The adjacent rooms (3, 4) are generally at a lower pressure than this overpressure (P+), which is referred to as normal pressure (P−).

However, in the usable area (3) of the third floor where the fire (7) is present, there may be a heat pressure (P++) caused by rising temperatures, which exceeds the overpressure level (P+) in the stairwell.

The closing bodies (10) are usually installed to open in the assumed direction of escape. This means that the door opening direction (R) is usually the same as the escape direction. The term "door opening direction" also analogously includes the opening direction of a window or flap.

In the example of FIG. 2, the escape direction and the opening direction (R) coincide for all the shown closing bodies (10) and are jointly represented by an arrow.

The opening direction (V) of a valve flap (32) may be provided in the same or opposite direction to the door opening direction (R), which may result in different functionalities and advantages, as explained in the following examples.

Figure 3:
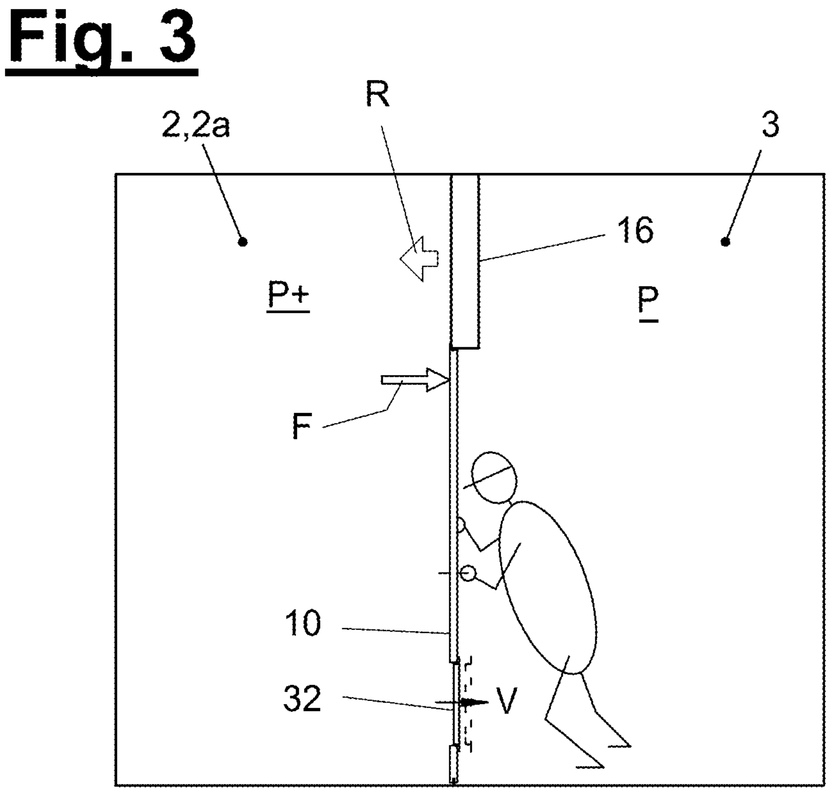
FIG. 3 is an illustration explaining the function of a closing body that opens in the direction of escape or against the pressure difference force.

FIG. 3 illustrates an example that may occur at the door of the lowest usable area (3). It is assumed that a person is in the usable area (3) and wants to escape towards the stairwell (2*a*) through the passage that is closed by the closing body (10), here a door (11). In this case, the door opens in the opening direction (R) towards the stairwell (2*a*), where the overpressure (P+) prevails. The much lower normal pressure (P−) prevails in the usable area (3). In other words, there is a pressure difference above the closed locking body (10), resulting in a pressure difference force (F) acting against the door opening direction (R) and thus also against the escape direction. This pressure difference force (F) may have the normally prescribed value of about 100 Newtons, but it can also be significantly higher and be 1000 Newtons, 2000 Newtons or even more.

Figure 5A:
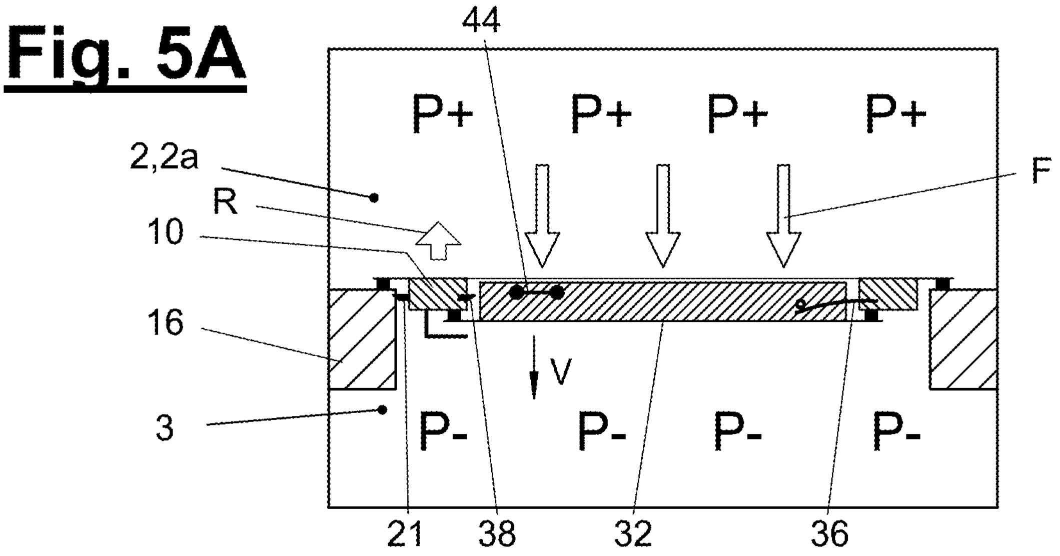
FIGS. 5A-5C are cross-sectional views of the closing body according to FIG. 3 at the level of the valve device in three successive states during the opening of the closing body.
Figure 5B:
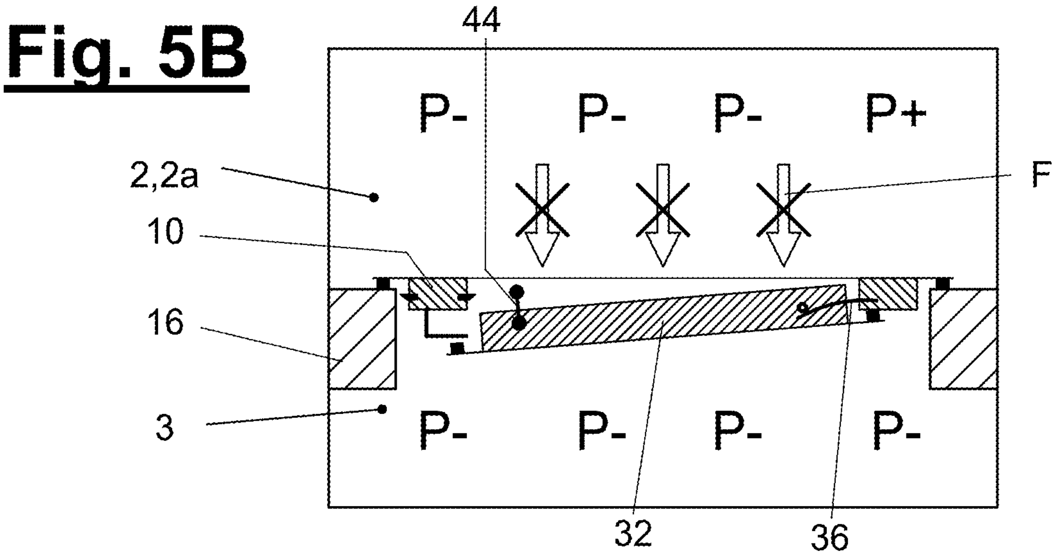
Figure 5C:
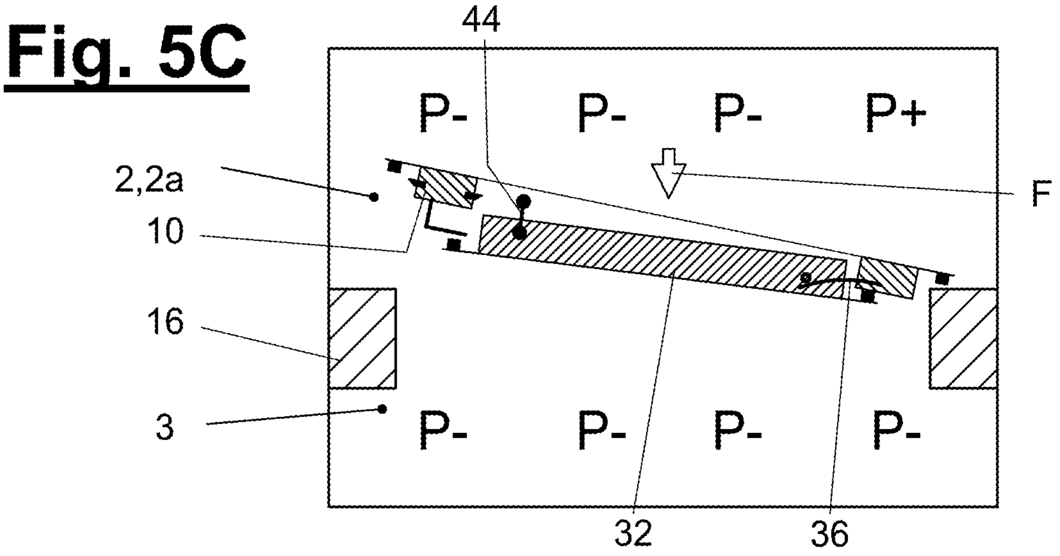

The fleeing person usually knows nothing about the pressure difference force, as this force is not visible. The person will grab the actuating pawl (22) of the closing body (10) and try to move it and push the door open to escape. Although the pressure difference force (F) acts against the door opening direction (R) and thus presses the door into the frame (16), the person is not prevented from escaping due to the innovation according to the present disclosure. FIGS. 5A to 5C explain the further processes to be expected.

FIG. 5A shows how the second latch or panic latch lock (38) opens as a result of the movement of the actuating pawl (22) and the operative coupling. This releases the valve flap (32). In the example shown, the opening direction (V) of the valve flap (32) is opposite to the door opening direction (R). The pressure difference force (F) therefore acts in the valve flap opening direction (V) and will continue to be present until the valve flap (32) is released. From the moment of release, the pressure difference force (F) pushes the valve flap (32) open with great impact in the direction of the lower pressure level, in this case the normal pressure (P−). A very fast opening movement of the valve flap (32) occurs. If there is a latching mechanism (46) on the valve flap (32) (not shown in FIG. 5A), for example a spring-loaded latch nose, the latching force (G') of the latching mechanism (46) is overcome. If a flap closer (36) is provided on the valve flap (32), the valve flap (32) is opened against the closing force(S) of the flap closer (36), whereby the flap closer is elastically tensioned.

An opening limiter (44) is preferably provided, which permits a certain opening width of the valve flap (32) up to a threshold value, but not beyond it. The threshold value can be in the range of a few centimeters and in particular less than 10 cm, further in particular less than 7 cm.

FIG. 5B explains the condition that results from the opening of the valve flap (32). At least in a local area on both sides in front of and behind the closing body (32), a pressure equalization occurs, represented by the symbol (P−) for the normal pressure on both sides of the closing body (10) in front of and behind the opening zone of the valve device (28).

In global terms, there may still be a pressure difference between the stairwell (2*a*) and the usable area (3), for example because the smoke pressure system (5) continues to supply air. But at least in the immediate vicinity of the closing body (10), the magnitude of the pressure difference drops massively, so that the pressure difference force (F) is nearly eliminated. This effect occurs within fractions of a second, so that the fleeing person does not even notice that the door was previously still pressed shut with a force of, for example, 1000 Newtons or more.

Thus, according to the transition from FIG. 5B to FIG. 5C, the fleeing person can open the closing body (10) unhindered. Since the pressure difference force (F) is now no longer acting or hardly acting at all, the valve closer (36) can move the valve flap (32) back into the closed position. The valve flap is secured in the closed position by the second latch or panic latch lock (38). After the fleeing person has moved away, the door closer also brings the closing body (10) back into the closed position in order to separate the pressurized room (2), in this case the stairwell (2*a*), from the usable area (3) again in as gas-tight a manner as possible.

Figure 4:
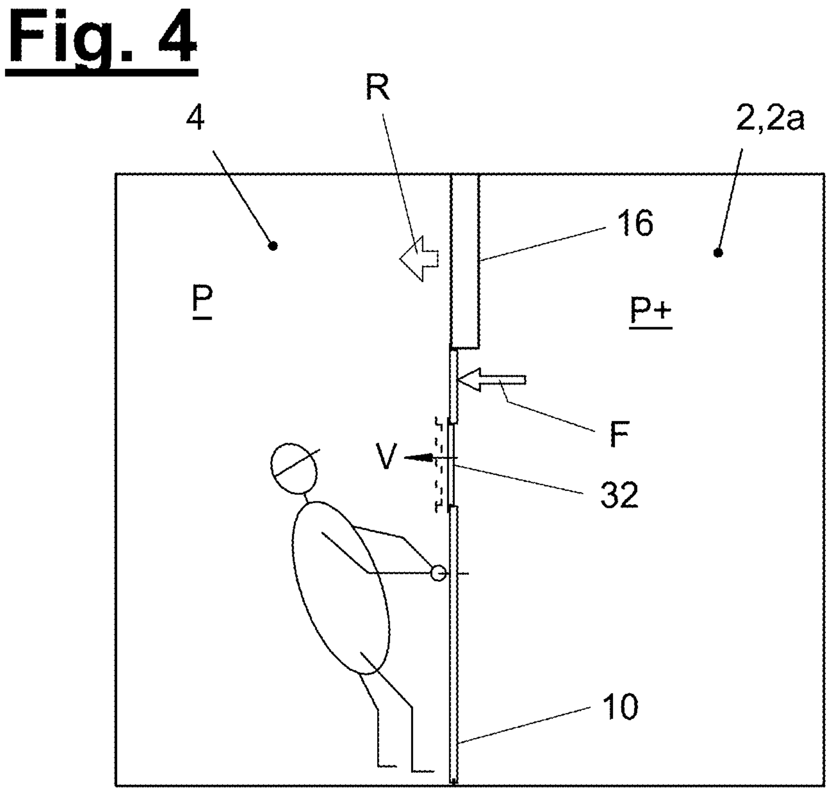
FIG. 4 is an illustration explaining the function of a closing body that opens against the direction of escape or in the same direction as the pressure difference force.

FIG. 4 illustrates another case which can occur, for example, at the door on the ground floor of the building shown in FIG. 2. In this example of FIG. 4, the pressure difference above the closing body (10) is in the opposite direction to the situation in FIG. 3.

It is assumed here that a person is in the foyer (4) and wants to enter the stairwell (2*a*), for example, to rescue other people or fight the fire (7). The person wants to go through the passage that is closed by the closing device (10). In this case, the door opens away from the stairwell (2*a*), where there is overpressure (P+). In the foyer (4), there is normal pressure (P−), which is significantly lower. In other words, there is a pressure difference over the closed closing device (10), resulting in a pressure difference force (F) acting in the same direction as the door opening direction (R) and thus also in the same direction as the escape direction. This pressure difference force (F) can again have the required value of about 100 Newtons according to the standard. However, it can also be significantly higher and be 1000 Newtons, 2000 Newtons, or even more.

Figure 6A:
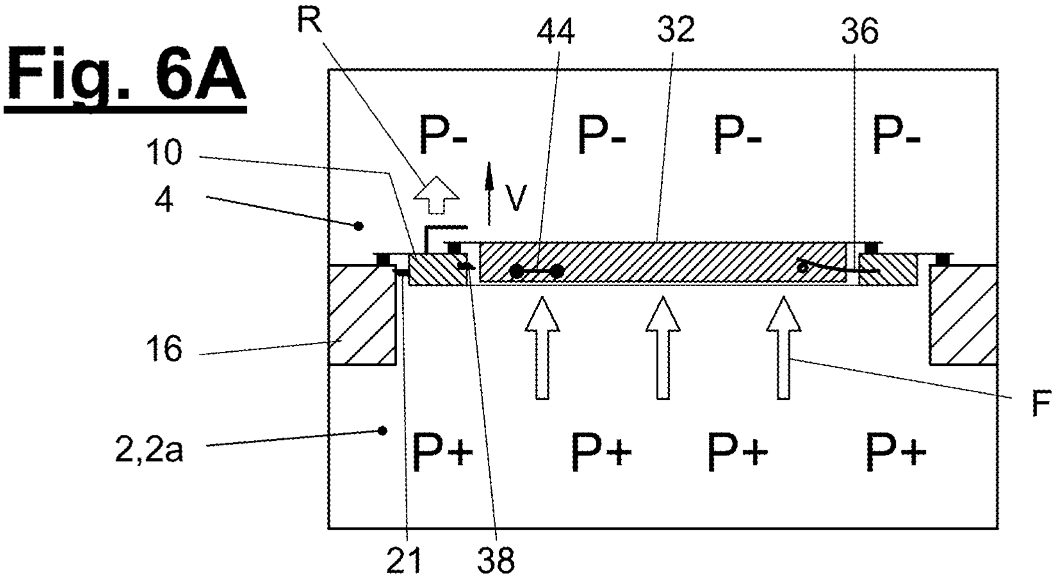
FIGS. 6A-6C are cross-sectional views of the closing body according to FIG. 4 at the level of the valve device in three successive states during opening of the closing body.
Figure 6B:
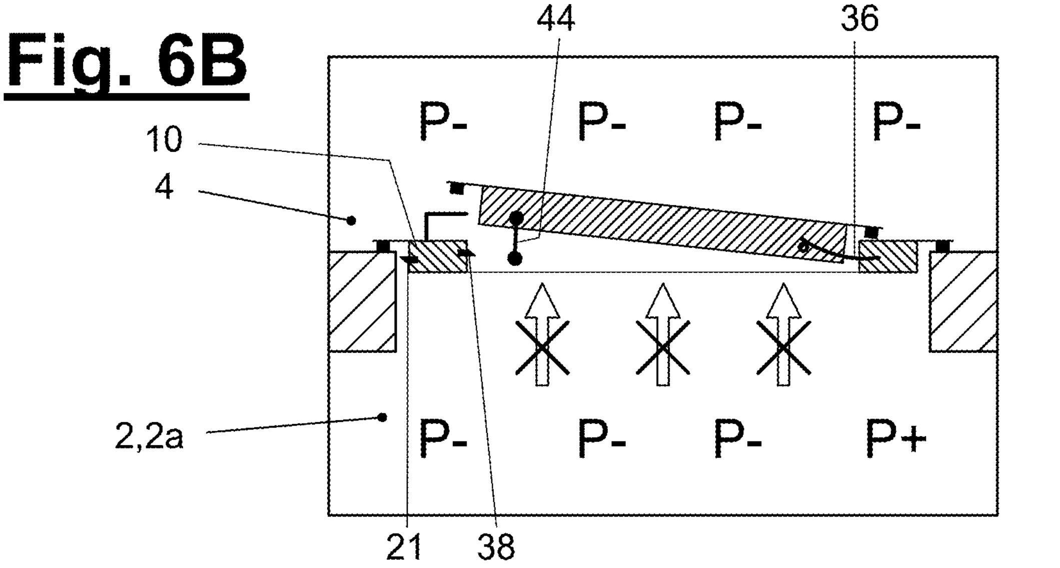
Figure 6C:
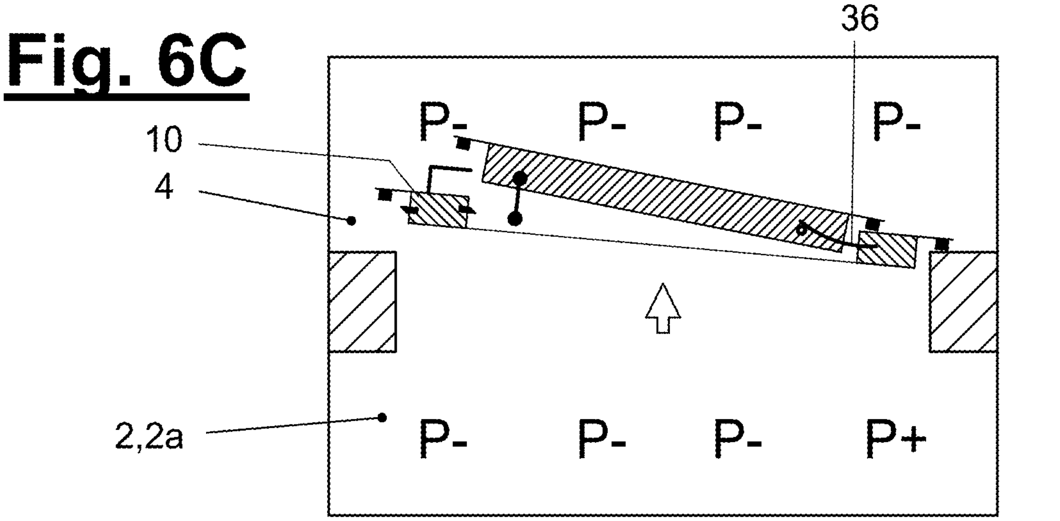

The entering person also does not know about the pressure difference force in this case, especially if it is a civilian with a rescue intention, because the pressure difference force (F) is not visible. The person will move the actuating pawl (22) of the locking device (10) and try to pull the door open. The pressure difference force (F) now acts in the same direction as the door opening direction (R) and thus presses the door out of the frame (16). Due to the innovation according to the present disclosure, however, the person is not injured when opening the closing device (10). FIGS. 6A to 6C explain the further processes to be expected.

In FIG. 6A, it is shown how, as a result of the movement of the actuating pawl (22) and the operative coupling, the second latch or the panic latch lock (38) opens again, in this case earlier than the first latch (21). This (initially exclusively) releases the valve flap (32). In the example shown in FIG. 6A, the opening direction (V) of the valve flap (32) is now the same as the door opening direction (R), i.e., the opposite of FIG. 5A. However, the pressure difference force (F) again acts in the valve flap opening direction (V) and will also be present until the valve flap (32) is released. The pressure difference force (F) will push the valve flap (32) with great impact towards the lower pressure level, i.e., the normal pressure (P−), from the moment of release. A very fast opening movement of the valve flap (32) also occurs here. If a latching mechanism (46), for example, a spring-loaded latch nose, is present on the valve flap (32) (not shown in FIG. 5A), the latching force (G') of the latching mechanism (46) is overcome. If a flap closer (36) is provided on the valve flap (32), the valve flap (32) is opened against the closing force(S) of the flap closer (36), whereby the flap closer is elastically tensioned.

An opening limiter (44) is preferably provided, which allows a certain opening width of the valve flap (32) up to a threshold value but not beyond. The threshold value can be in the range of a few centimeters.

FIG. 6B illustrates the state that occurs when the valve flap (32) is opened. Here too, at least in a local area on both sides in front of and behind the closing body (32), there is pressure equalization. Although there may still be a pressure difference between the stairwell (2*a*) and the foyer (4) in a global context, for example because the smoke pressure system is still supplying air, at least in the immediate vicinity of the closing body (10), the amount of the pressure difference drops significantly in this example, so that the pressure difference force (F) is almost cancelled out. This effect occurs again within a fraction of a second.

With a short delay, the first latch (21) now opens so that the closing body (10) is completely unlocked and can be opened normally. In this case too, the person entering does not notice that the door was subjected to a force of, for example, 1000 Newtons or more in the opening direction for fractions of a second prior.

Thus, according to the transition from FIG. 6B to FIG. 6C, the person entering can open the closing body (10) without it pushing back. Since the pressure difference force (F) no longer acts or only to a very small degree, the flap closer (36) can also move the valve flap (32) back into the closed position in this example. The valve flap (32) is secured in the closed position by the second latch or panic latch lock (38). After the person entering has left, the door closer (26) returns the closing body (10) to the closed position to separate the room (2), here the stairwell (2*a*), which is pressurized, from the usable area (3) as gas-tight as possible.

Figure 7:
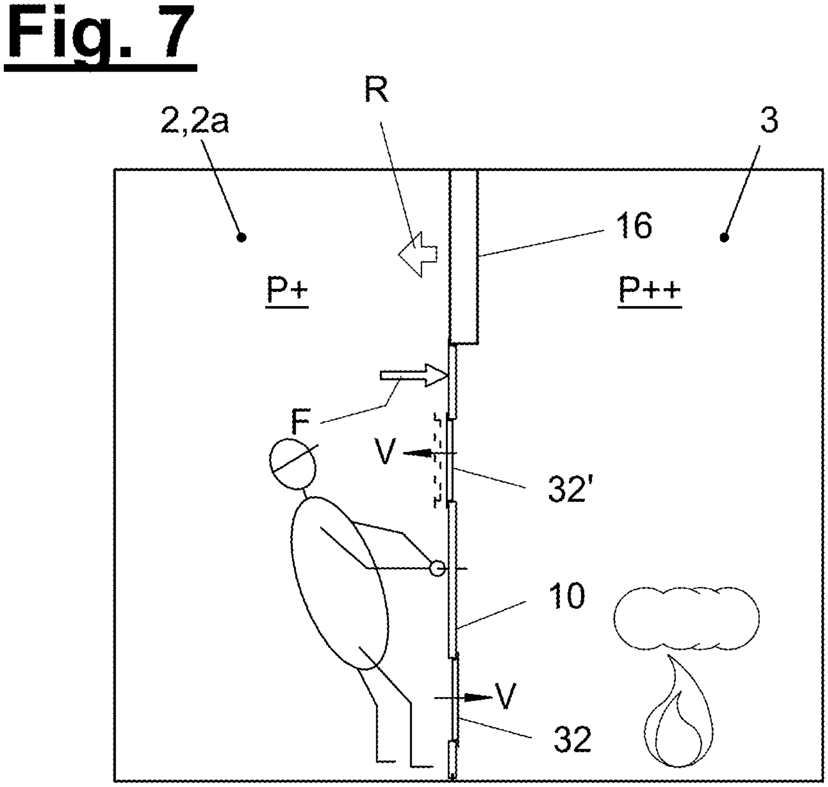
FIG. 7 is another illustration explaining the functioning of a closing device, analogous to FIGS. 3 and 4, for another application.

It is easy to see that the situation described above for the door on the ground floor, in which there is a pressure difference that generates a pressure difference force (F) in the same direction as the opening direction (R), can also occur on the upper floor where, in the example of FIG. 2, the fire (7) is located. This situation is shown in FIG. 7.

In this case, a person entering would try to enter the usable area (3), which is under heat pressure (P++), from the stairwell (2*a*), where the overpressure level (P+) prevails. However, the first valve flap (32) (lower flap in FIG. 7), whose opening direction (V) is directed towards the usable area (3) according to the example of FIG. 3, would not be advantageous. Because the heat pressure (P++) could still lead to a pressure difference force (F) against the opening direction (V) of the first valve flap (32) even towards the stairwell (2*a*), which is pressurized by the smoke pressure system (5) with the overpressure (P+).

As can be seen from the comparison of the examples of FIG. 5A-5C with FIG. 6A-6C, it is particularly advantageous to provide for a delayed release of the first latch (21) or a delayed release of the locking fitting (18) compared to the release of a second latch (38) if the second latch (38) releases a valve flap (32) whose opening direction (V) coincides with the door opening direction (R).

Also, in the passage between the stairwell (2*a*) and the lock (2*b*) according to FIG. 1, it cannot be reliably predicted in which direction a pressure difference exists over the respective closing body (10), especially if the lock (2*b*) is also pressurized by a smoke pressure system. The currently existing pressure difference can be in one direction or the other, especially depending on the order in which the two closing bodies (10,11) are opened.

It can be advantageous to provide a first valve flap (32) and additionally a second valve flap (32) on a closing body (10), wherein the opening direction (V) of the second valve flap is oriented opposite to the opening direction (V) of the first valve flap (32). This allows for a temporary pressure equalization for both possible directions of the pressure difference over the closing body (10).

It can also be advantageous to provide a first valve flap (32) in a first height section of the closing body (10) and a second valve flap (32) in a second height section. The first valve flap (32) can be provided in the upper or lower half of the closing body, and the second valve flap (32) can be provided in the other half.

Limiting the opening width of the valve flap (32) significantly reduces the risk of injury. The height position of the valve flap (32) arrangement can result in additional advantages and further reduce the risk of collision.

A valve flap whose opening direction (V) is in the same direction as the door opening direction (R) can advantageously be arranged in an upper section of the closing body (10), which is expected to be at chest height of the fleeing person. Because a person who wants to open a door by pulling is generally further away from the door leaf with the upper body section than with the lower body section (cf. pose in FIG. 4). An arrangement in the upper section thus promises a lower risk of collision.

A valve flap whose opening direction (V) is in the opposite direction to the door opening direction (R) can advantageously be arranged in a lower section of the closing body (10), which is expected to be at the leg or knee height of the fleeing person. Because a person who wants to open a door by pushing is generally further away from the door leaf with the lower body section than with the upper body section (cf. pose in FIG. 3).

In the example of FIG. 1, the door (11) can only be opened outward-viewed from the room under pressure-so that the escape route can be quickly cleared. A person entering from outside into the pressurized room and opening the door (11), would have the door (11) swing back due to the pressure, potentially even injuring the person. Therefore, first the valve flap (32) of the valve device (28) opens to establish a pressure balance. Only then can the door (11) be opened essentially without pressure. For this purpose, the valve flap (32) is mechanically connected to the panic lock (24) via the release mechanism (42). The release mechanism (42) then releases the valve device (28) and then the door (11).

Figure 9:
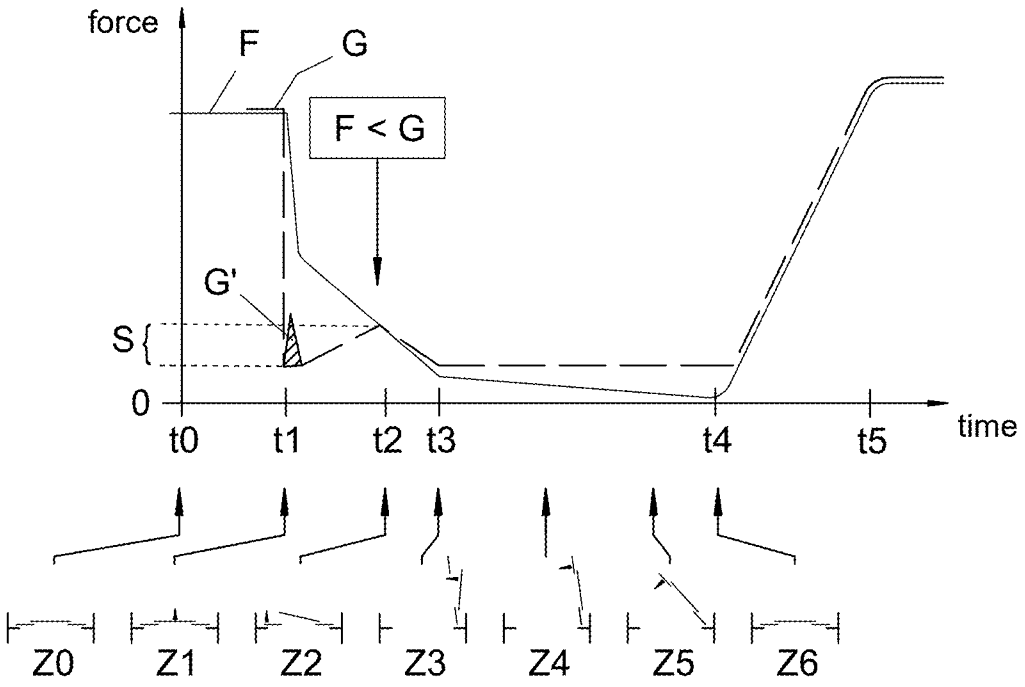
FIG. 9 shows exemplary force curves on a closing body during complete execution of an opening process.

FIG. 9 illustrates the curves of a pressure difference force (F) in the opening direction of the valve flap (32) and the opposing closing forces (G, G', S) for the example of FIGS. 4 and 6A to 6C over time. Below the diagram, the opening and closing states of the closing body (10) and the valve flap (32) are illustrated.

At time tO (state ZO), the closing body and valve flap (32) are closed. The full pressure difference force (F) is applied to the valve flap (32). The second latch (38) holds the valve flap (32) in the closed position. The second latch (38) produces a reaction force as a closing force (G) that has the same magnitude as the pressure difference force (F). Any part of the closing force (G) may also be generated by a permanent preload of the flap closer (26).

At time t1 (state Z1), the actuating element (22) is moved, and the second latch (38) releases the valve flap (32). This abruptly eliminates a portion of the closing force (G) and triggers an opening movement of the valve flap (32). If a latching mechanism (46) is present, its latching force (G') is also overcome because the pressure difference force (F) still has a high value. The opening movement of the valve flap (32) continues, thereby enabling the temporary pressure equalization. The opening movement of the valve flap (32) occurs by overcoming the closing force (S) of the flap closer (26), which is thereby tensioned until the maximum opening width is reached.

At time t2 (state Z2), the maximum opening width of the valve flap (32) is reached. The distance between the times t1 and t2 is shown greatly enlarged in FIG. 9 to allow readability of the diagram. In reality, these times can occur only a few fractions of a second apart.

As the pressure difference force (F) is reduced, the closing body (10) begins to move in the opening direction. Therefore, the states Z1 and Z2 may not be clearly separable but may overlap.

Through the opening of the closing body (10), the pressure difference force (F) acts to a decreasing extent on the valve flap (32), approximately with the cosine component of the door opening angle.

As soon as the closing forces (G) on the valve flap (32) predominate, a closing movement of the valve flap (32) begins. This moment is exemplarily marked with the term "F<G" in FIG. 9. The closing force can be mainly applied by the force (S) of the flap closer (26). The closing force (S) of the flap closer (26) is so high that it overcomes those forces that may be generated by the latching mechanism (46) and/or the insertion of the (soft-switched) second latch (38) (see FIG. 8*b*).

At time t3 (state Z3), the door opening is maximal, and the valve flap (32) is already in the closed state or now reaches it. At the latest now, the person will release the actuating pawl (22) so that the second latch (38) returns to the extended position and secures the valve flap (32) in the closed position.

States Z4 and Z5 illustrate the closing movement of the closing body (10) which is caused by the door closer (26).

At time t4 (state Z6), the closing body (10) is again completely in the closed position. The different seals (48, 58) preferably provide for a substantially volumetric separation between the interior and exterior room. As a result of the air supplied by the smoke pressure system (5), a back pressure can build up again. The temporary pressure equalization is thus completed.

At time t5, the pressure in the room (2, 2*a*, 2*b*) in front of the closing body (10) also reaches its level provided for fire safety.

For the escape of a single person through an access opening or passage of the room under a overpressure, it usually takes only a few seconds between the time t1 (release of the valve flap) and the time t5 (rebuilding of the overpressure in the escape route), particularly between 5 and 10 seconds. This maximizes the effectiveness of the smoke pressure system (5).

Figure 10:
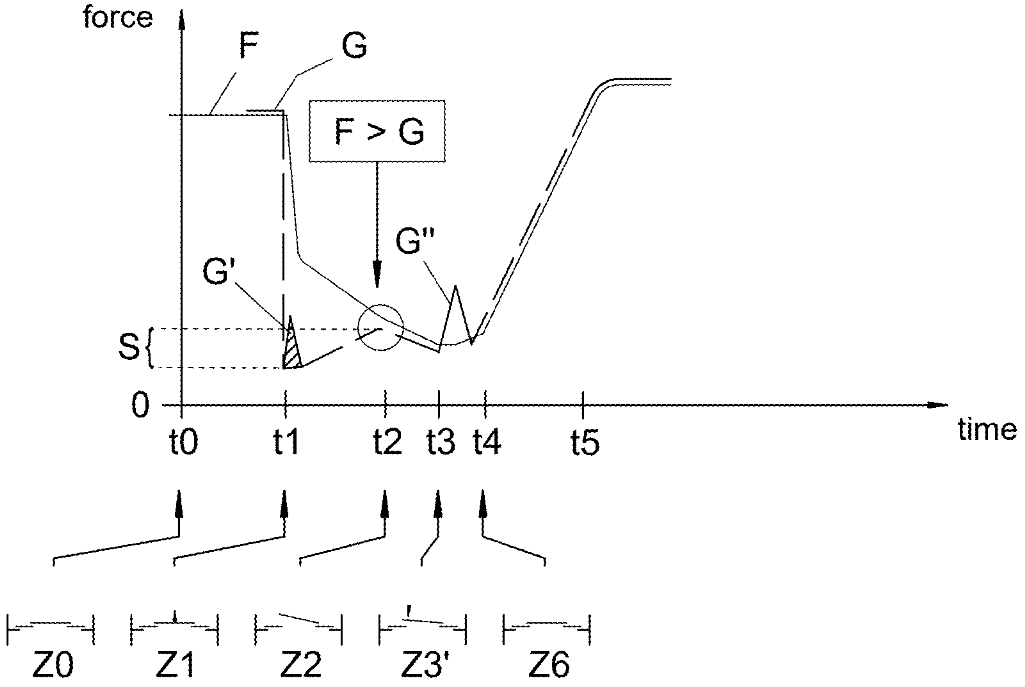
FIG. 10 shows force curves on a closing body in the event of incomplete opening.

FIG. 10 shows an alternative force curve similar to FIG. 9. In this case, it is assumed that for some reason the opening of the closing body (10) is initiated but only partially completed. Such a state could occur, for example, if a person realizes during the movement of the actuating pawl (22) that there is a dangerous situation behind the closing body (10) and then refrains from further opening the closing body (10), while the valve flap (32) has already been released and pressure equalization has been initiated. The processes for the time points t0 and t1 (states 0 and Z1) are identical to the example of FIG. 9.

At time t2 (state Z2), the valve flap (32) is partially opened to a certain extent, whereby the existing latching force (G') and the closing force (S) of the flap closer have been overcome for the opening distance up to that point. At the same time, however, the pressure difference force (F) decreases to a lesser extent than in FIG. 9 because the closing body (10) does not open additionally and any pressure-increasing effect by the smoke pressure system may already be in effect.

Therefore, a state may occur in which the closing force (S) of the flap closer still causes a partial movement of the valve flap (32) towards the closed position, but this is not reached because the forces (F) acting in the opening direction exceed the closing forces (G). This point is marked in FIG. 10 with the term "F>G".

In such a situation, the sealing closure of the valve flap (32) could be compromised, so that the protection against the entry of smoke through the access opening or passage would be impaired or the re-attainment of the desired overpressure level in the escape room could be impaired. If such a malfunction were to occur only on one or a few closing bodies (10) of the building (1), the smoke pressure system (5) would probably be sufficient to achieve the desired effect despite the resulting leakage flow. Nevertheless, it would be advantageous to avoid such states with an undesired residual opening of the valve flap.

Figures 11A, 11B:
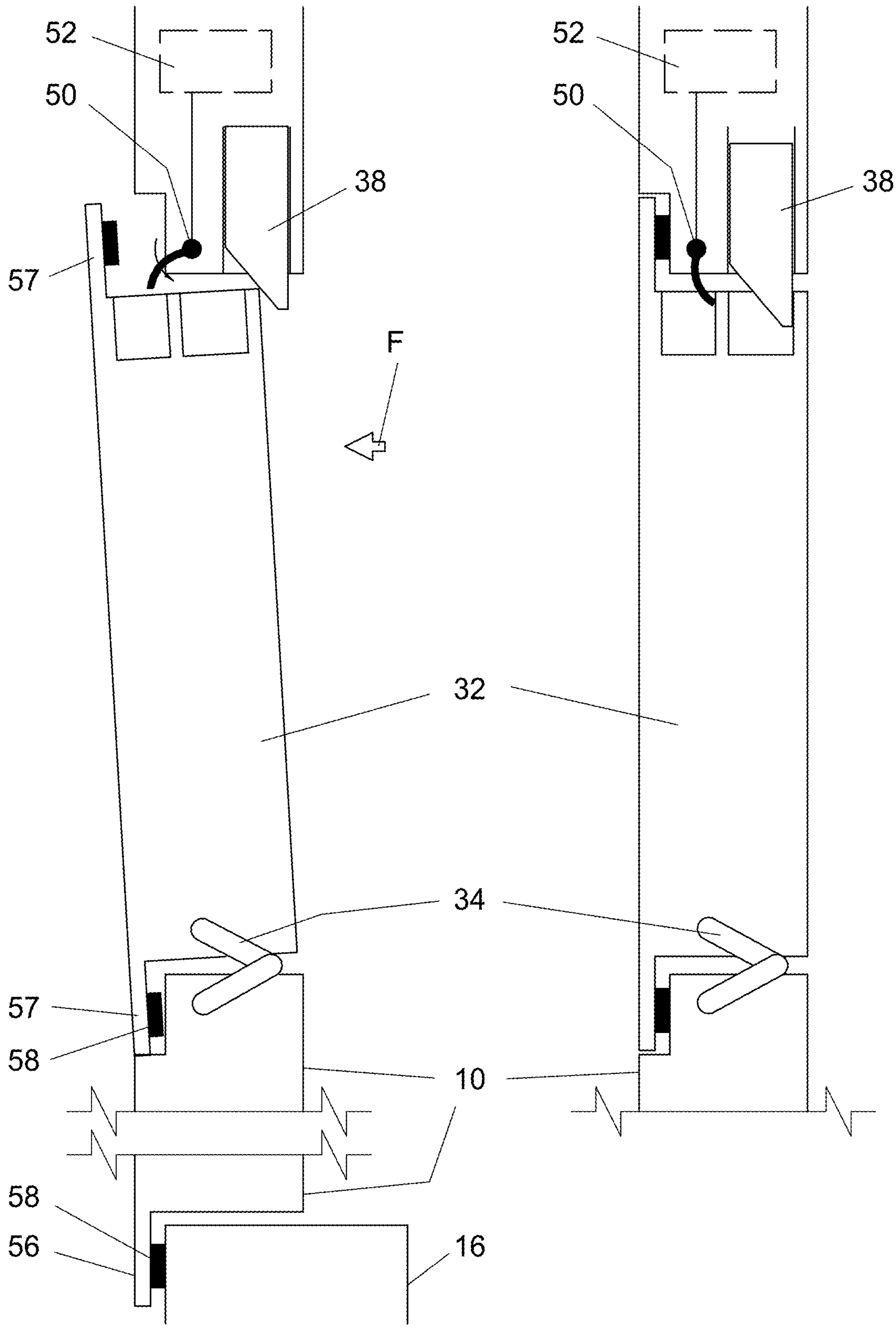
FIGS. 11A-11B are detailed views of an additional closing device.

FIGS. 11A and 11B illustrate an advantageous design of the closing body with which an undesired residual opening of the valve flap (32) can be eliminated.

The closing body (10) preferably has an additional closing device (50) designed to drive the valve flap (32) from an open position, in which the opening width is greater than zero and less than a residual opening threshold, into the closed position. The additional closing device can have any suitable design. It can, for example, act mechanically and be designed as a movable and drivable lever, which is assumed to be representative below. Alternatively, the additional closing device (50) can operate in any other suitable way, especially magnetically, electrically, hydraulically, or pneumatically.

The additional closing device (50) preferably has a movement device designed in such a way that the additional closing device (50), starting from a waiting position (FIG. 11A) in which the additional closing device is not engaged with the valve flap (32), is moved to a closing position (111B) while taking along the valve flap (32).

The movement device can have any design. In the example of FIG. 11, it can be a bistable gear.

The movement device can also be designed in such a way that the additional closing device (50) is automatically moved back to the waiting position after reaching the closing position. In this way, it is achieved that the additional closing device does not impede an opening movement of the valve flap (32), i.e., does not cause any additional force (G) in the closing direction. In other words, the additional closing device (50) acts exclusively in a driven manner in the closing direction of the valve flap (32).

It is further advantageous if the additional closing device (50) has a triggering means to trigger a movement of the additional closing device (50) from the waiting position to the closing position. The triggering means can have any design. In the example of FIG. 11, the triggering means is not shown. However, it could be designed, for example, as a mechanical switching means, especially as a one-sided follower, which is activated during a movement of the valve flap (32) in the closing direction when the residual opening threshold is reached.

Thus, the triggering means is preferably designed in such a way that it triggers the movement when the valve flap (32) is in a partially open state in which the opening width is less than or equal to the residual opening threshold.

A particularly energy-efficient effect is achieved if the triggering means is designed in such a way that it continues to trigger the movement only when the partially open state is reached at the end of an opening movement and/or when the partially open state persists for a period greater than a waiting time threshold.

In this way, it is achieved that the additional closing device (50) is only activated when the regular closing according to the example of FIG. 9 based on the force (S) of the flap closer is not successful or is too slow.

The additional closing device is preferably connected to an energy storage (52). In the example shown, this can be a mechanical energy storage (52), which includes a tensionable driving means.

The energy storage (52) can preferably be charged via a movement of the actuating pawl (22), in particular via multiple movements of the actuating pawl. This achieves that the energy required for the residual closing of the valve flap (32) is not drawn from a movement generated by the pressure difference force (F), but for example via the regular door actuation outside of a fire. The energy storage (52) can thus be pre-charged before the fire occurs.

Particularly preferably, in the fully charged state, the energy storage (52) can support a first actuation of the additional closing device (50) and, without an intermediate charging process, at least one further actuation of the additional closing device (50). A particularly secure embodiment is achieved when the energy storage (52) in the fully charged state supports at least five or even more consecutive actuations without intermediate charging processes.

Figure 12:
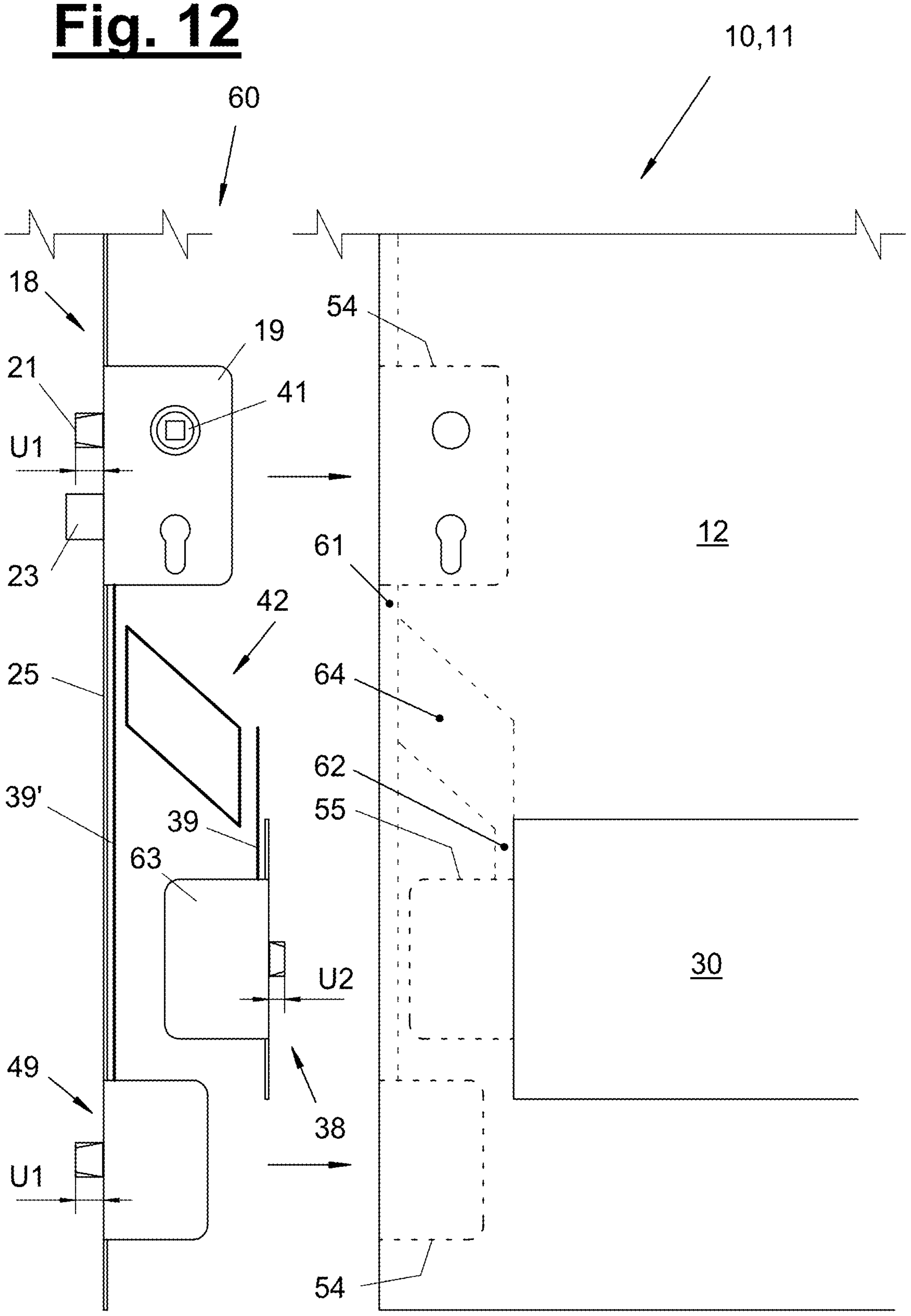
FIG. 12 shows a closing fitting set and a door leaf.

FIG. 12 shows an example of a door leaf (12) and a closing fitting set (60), which can be used individually or together to form a closing body according to the present disclosure. The closing fitting set (60) can also be used with another door leaf, for example an existing door on which an opening (30) is separately introduced. On the other hand, the door leaf (12) can also be combined with other closing means to achieve the required function of the closing body (10) according to the present disclosure. However, the devices shown in FIG. 12 have particular advantages and enable a modular construction of closing bodies (10) for various applications.

The closing fitting set is intended for attachment to a door leaf (12) of a pivoting door (11) or a pivoting window or a pivoting closure. It is also intended to form a closing body (10) according to the present disclosure.

The closing fitting set (60) comprises a locking fitting (18) for mounting on the door leaf (12) and further comprises a thrust rod (39') which is moved correspondingly to a closing movement of a first latch (21) of the locking fitting (18) and/or correspondingly to a movement of the actuating pawl (22) or the release mechanism (42) of the locking fitting (18).

In addition, the closing fitting set (60) comprises an additional latch, which is designed as a panic latch lock (38) with a lock case (63) and a thrust body (39), and a release mechanism (42) for connecting the thrust body (39) to the thrust rod (39').

The terms "thrust rod" and "thrust body" refer to structural means whose function is familiar to the person skilled in the art. They include translationally movable devices for transmitting forces that must be rigid in at least one load direction, such as rods, rails, bolts, ropes, chains, and the like. However, they also include partially or fully rotatable devices.

In a preferred embodiment, the closing fitting set additionally comprises a valve device (28), which is designed as a valve flap (32) and can be inserted into an opening (30) of the door leaf.

As part of the planned assembly, a release mechanism (42) is formed by connecting the thrust body (39) and thrust rod (39'), which is operatively coupled to the locking fitting (18) and opens the valve device (28) to effect a temporary pressure equalization when there is a pressure difference between the inside and outside of the existing door upon opening the door leaf.

A closing body is thus created according to the above explanations.

In the example of FIG. 12, the valve flap (32) is not shown for the sake of simplicity. It can have any suitable design, for example, as shown in FIGS. 1 and 3 to 8 and 11.

The valve flap (32) is preferably pivotably connected to the closing body (10) via one or more pivot devices, in particular hinge straps (34). The pivot devices can be separate or part of the door leaf (12) or the closing fitting set (60). The at least one pivot device is in the intended assembly state preferably arranged on an outer side of the closing body (10) and the valve flap (32) (see FIG. 1). Alternatively, it can be arranged concealed in a gap between the valve flap (32) and the edge of the opening (30) (see FIG. 11).

The closing fitting set (60) comprises the second latch, which is arranged at the edge of the opening (30) in the intended assembly state and secures the valve flap (32) in the closed position. Particularly preferably, the closing fitting set (60) comprises a panic latch lock (38), which is designed as an insert lock with a lock case (63). This allows for a modular design and facilitates the assembly of the second latch to the door leaf (12).

The closing fitting set (60) may also comprise at least one further panic latch lock (49) and/or at least one further bolt lock, which is operatively coupled to the locking fitting (18) in the intended assembly state.

The door leaf (12) according to the preferred embodiment in FIG. 12 is the door leaf (12) of a pivotable door (11), a pivotable window, or a pivotable closure. The term "door leaf" thus represents the movable main part of a closing body (10) to be formed, which opens or closes the access opening to the room that is under pressure.

The door leaf (12) has at least one opening (30) to which a valve flap can be attached or is attached. The door leaf (12) has at an outer edge at least one case receptacle (54) and a thrust rod channel (61) that adjoins the case receptacle (54).

The door lock (20) is preferably insertable into the case receptacle (54). The thrust rod (39') is preferably receivable in the thrust rod channel (61). In the intended assembly state, the thrust rod channel (61) is preferably covered by a cover plate (25).

The door leaf (12) further comprises another case receptacle (55) at an edge portion of the opening (30), which is designed to receive a lock case (63) of a panic latch lock (38), and a thrust body channel (62) that extends in the direction of the first case receptacle (54).

In the intended assembly state, the thrust body (39) of the panic latch lock (38) is received and possibly guided in the thrust body channel (62).

In a preferred embodiment, the door leaf can also have a connecting cavity (64) in an area between the thrust rod channel (61) and the thrust body channel (62). Another part of the release mechanism (42) can be accommodated and optionally guided in this connecting cavity, especially a bridge or a spacer, through which the thrust body (39) and the thrust rod (39') are connected in an operative manner. In the example of FIG. 12, the other part of the release mechanism (42) is exemplarily designed as a coupling linkage, which here has a parallelogram form. The coupling linkage can be connected to the thrust rod (39') and the thrust body (39) in any way, for example by welding, gluing, screwing, or riveting.

The coupling linkage can also be designed as a single rod, a flat body (see FIG. 1), or a multiple linkage with a different shape.

Power transmissions, gears, cable pullers, or chain pullers are also suitable as other parts of the release mechanism (42).

All the components of the closing fitting set (60) and the door leaf (12) described in FIG. 12 can individually or in any combination also be part of the closing body (10). On the other hand, all means attached to the door leaf (12) that contribute to the closing function, especially the door closer (26), the flap closer (36), the opening limit (44), the additional closing device (50), the energy storage 52, the latching mechanism (46), and the hinge straps (14, 34), can be a component of the closing fitting set (60).

The release mechanism (42), especially the panic latch lock (38), preferably comprises at least one thrust body (39) that can be coupled or is coupled in an operative manner with the locking fitting (18). The coupling can take place in any way. For example, a separate gear can be provided (not shown), which is connected to the actuating pawl (22) or a pawl receptacle (41) of the locking fitting (18) and transmits movement of the actuation pawl (22) or the pawl receptacle (41) to the thrust body (39).

The locking fitting (18) can alternatively or additionally have a thrust rod (39'). The gear can be connected to a thrust rod (39') of the locking fitting (18) and transmit a movement of the actuating pawl to the thrust rod (39'). In particular, the thrust rod (39') can be moved correspondingly to a retraction movement of the first latch (21). It can alternatively or additionally be moved correspondingly to a movement of the actuating pawl (22) or the pawl receptacle (42).

In all the above-mentioned cases, it is achieved that when the actuating pawl (22) is moved, the thrust body (39) moves, and thus the second latch (38) also moves. The coupled movements can take place at the same speed or at different speeds. In particular, a retraction movement of the second latch can be slightly accelerated compared to a retraction movement of the first latch. Alternatively, any other design of the release mechanism (42), the coupling device (40) is possible to achieve the aforementioned effect.

According to an optional embodiment, the second latch (38) may have a tongue length (U2) that is shorter than the tongue length (U1) of the first latch (21). This achieves that with essentially uniform movement of the first latch and second latch, the release threshold is reached earlier at the second latch (38) than at the first catch. This allows the valve flap (32) to be released earlier than the closing body (10).

The ratio of the surfaces of the closing body (10), especially the door leaf (12), and the valve flap (32) can be chosen arbitrarily. Preferably, a valve flap (32) has a size that corresponds to at least 5-10% of the surface of the closing body (10), especially the door leaf (12). The size of the valve flap (32) can further preferably be 20% to 40% of the surface of the closing body (10). Such surface ratios ensure that the temporary pressure equalization is achieved very quickly, which is advantageous for escape support.

Two or more valve flaps (32) can be provided. If several valve flaps (32) have a matching opening direction (V), the above recommendation for the surface ratio applies to the sum surface of these several valve flaps (32).

The valve flap (32) can have any position, any format, and any angular position.

The hinge strap side of the valve flap (32) can be provided at any angle to the closing body (10). The hinge strap side can be located at the upper edge of the opening (30), the lower edge of the opening (30), or a lateral edge of the opening (30).

The design according to FIG. 1 is particularly preferred. Here, the hinge strap side is provided on a lateral edge of the opening (30), in particular on the edge of the opening (30) that is away from the locking fitting (18).

The second latch (38), especially the panic latch lock, can be provided at any edge of the opening (30). The panic latch lock is preferably provided opposite the hinge strap side. Alternatively or additionally, a second latch, especially a panic latch lock, can be provided on a side that is substantially transverse to the hinge strap side.

The closing body (10) may comprise at least one further panic latch lock (49) and/or at least one further bolt lock (not shown), which is/are operatively coupled to the locking fitting (18) (see FIG. 12 below). The further panic latch lock (38) and/or bolt lock may be a component of the closing fitting set.

The further panic latch lock (49) may be operatively connected to the door lock (20) via the thrust body (39'). The further bolt lock may be operatively connected to the door lock (20) via another mechanism.

The cover plate (25) can rigidly connect the door lock with at least one additional panic latch lock (49) and/or at least one additional bolt lock to provide support for the thrust body (39') and/or the additional mechanism and/or the thrust rod (39).

The closing body (10) can have a first valve flap (32) and at least one additional valve flap (32', 32"). The additional valve flap (32') can be separately arranged in another opening of the door leaf (12). Alternatively, it can be arranged as a cascaded valve flap (32") in an opening that is arranged in the first valve flap (32).

Modifications of the invention are possible in various ways. In particular, the features shown, described, or claimed in the respective exemplary embodiments can be combined with each other in any way, replaced, supplemented, or omitted.

REFERENCE LIST

1 building
2 room
2*a* escape route room/stairwell
2*b* escape route room/lock
3 usable area
4 foyer
5 smoke pressure system
6 smoke and heat exhaust
7 fire
8 smoke
9 window
10 closing body
11 door
12 door leaf
14 hinges
16 Frame/door frame
18 locking fitting
19 lock case
20 door lock
21 first latch
22 actuating pawl
23 bolt
24 panic lock, first latch
25 cover plate
26 door closer
28 valve device
30 opening
32 valve flap
34 hinge straps
36 flap closer
38 second latch, panic latch lock
39 thrust body
39' thrust rod
41 nut/pawl receptacle
42 release mechanism
43 pressure sensor
44 opening limiter
46 latching mechanism
48 sealing rail
49 further panic latch lock
50 additional closing device
52 energy storage
54 case receptacle
55 case receptacle
56 door fold
57 flap fold
58 seal
60 closing fitting set
61 thrust rod channel
62 thrust body channel
63 lock case
64 connecting cavity
F pressure difference force
F' pressure difference force with incomplete opening
G closing forces second latch & flap closer
G' latching force
G" additional closing force
P pressure level/local pressure zone
Pa atmospheric pressure
P− normal pressure
P+ overpressure
P++ heat pressure
R door opening direction
S closing force
U1 tongue length of first latch
U2 tongue length of second latch
V opening direction
Zi states of closing body and valve flap

The invention claimed is:

1. A closing body for closing and opening an access opening or a passage of a room, wherein a pressure difference exists between an interior and an exterior of the room, wherein the closing body (10) is formed as a pivotable door (11), pivotable window or pivotable closure, wherein a valve device (28) is provided on the closing body (10), wherein the valve device (28) effects a temporary pressure equalization when opening the closing body (10), wherein the valve device (28) is formed as a valve flap (32) and a release mechanism (42) is provided which opens the valve device (28), wherein a locking fitting (18) is provided for the closing body (10), wherein the release mechanism (42) is operatively coupled to the locking fitting (18) of the closing body (10),
wherein the locking fitting (18) is a door lock (20) with an actuating pawl (22),
wherein the locking fitting (18) includes a first latch (21) which holds the closing body in a closed state relative to a frame,
wherein the closing body includes a second latch (38) which holds the valve flap (32) in a closed state relative to the closing body (10),
wherein the door lock (20) is a panic lock (24) which can be opened from one side at any time in order to release an escape route,
wherein the first latch (21) is a component of the panic lock (24),
wherein the release mechanism (42) comprises at least one thrust body (39) which is operatively coupled to the locking fitting (18),
wherein the at least one thrust body (39) is connected to a thrust rod (39') which is moved correspondingly to a retraction movement of the first latch (21), and/or corresponding to a movement of the actuating pawl (22) or a pawl receptacle (42), and
wherein the closing body (10) comprises an additional closing device (50) adapted to drive the valve flap (32) from an open position, in which an opening width is greater than zero and less than a residual opening threshold, to a closed position.

2. The closing body according to claim 1,
wherein the release mechanism (42) releases only one opening of the valve device (28) and an opening movement of the valve device (28) is caused by a pressure difference force (F) resulting from the pressure difference between interior and the exterior of the room.

3. The closing body according to claim 2,
wherein the valve device is passive with respect to the opening movement.

4. The closing body according to claim 1,
wherein the valve device is self-closing.

5. The closing body according to claim 1,
wherein the locking fitting (18) is a mechanical, electronic, pneumatic and/or hydraulic locking fitting (18).

6. The closing body according to claim 1,
wherein the second latch (38) is designed as a panic latch lock which secures the valve flap (32).

7. The closing body according to claim 1,
wherein the release mechanism (42) is a mechanical, electronic, pneumatic and/or hydraulic release mechanism (42).

8. The closing body according to claim 7,
wherein a pressure sensor (43) is provided which controls the release mechanism (42).

9. The closing body according to claim 1,
wherein the release mechanism (42) comprises a control means, which opens the valve device (28) in time before the closing body (10).

10. The closing body according to claim 1,
wherein the second latch (38) has a tongue length (U2) that is shorter than the tongue length (U1) of the first latch (21).

11. The closing body according to claim 1,
wherein the additional closing device is connected to a mechanical energy storage.

12. The closing body according to claim 11,
wherein the mechanical energy storage (52) is charged via a multiple movement of the actuating pawl.

13. The closing body according to claim 12,
wherein the mechanical energy storage (52) in a fully charged state supports a first actuation of the additional closing device and, without an intermediate charging process, at least one further actuation of the additional closing device.

14. The closing body according to claim 1,
wherein the additional closing device (50) comprises a bistable gear,
wherein the bistable gear is designed in such a way that the additional closing device (50) can be actuated from a waiting position in which the additional closing device is out of engagement with the valve flap (32), into a closed position with entrainment of the valve flap (32).

15. The closing body according to claim 14,
wherein the bistable gear is further designed in such a way that the additional closing device (50) after reaching the closed position is automatically moved back to the waiting position.

16. The closing body according to claim 1,
wherein the additional closing device (50) comprises a triggering means for triggering a movement of the additional closing device (50) from a waiting position to the closed position.

17. The closing body according to claim 16,
wherein the triggering means triggers the movement when the valve flap (32) is in a partially opened state in which an opening width is less than or equal to a residual opening threshold.

18. The closing body according to claim 17,
wherein the triggering means further triggers the movement only
when the partially opened state is reached at an end of an opening movement, and/or
when the partially opened state is present for a time greater than a waiting time threshold value.

19. The closing body according to claim 1,
wherein the closing body has a fold (56) which overlaps a frame (16) in a closed state.

20. The closing body according to claim 1,
wherein the valve flap (32) has a fold (57) which, in a closed state, overlaps an inner contour of an opening (30).

21. The closing body according to claim 20,
wherein a seal (58) is arranged in a region of the overlap of the fold (56, 57).

22. The closing body according to claim 1,
wherein the valve flap (32) is pivotably connected to the closing body (10) by a hinge strap (34).

23. The closing body according to claim 22,
wherein the hinge strap (34)
is arranged on an outer side of the closing body (10) and the valve flap (32); or
is arranged concealed in a gap between the valve flap (32) and an edge of the opening (30).

24. The closing body according to claim 6,
wherein the panic latch lock (38) and/or the door lock (20) is a mortise lock with a lock case (19).

25. The closing body to claim 1,
wherein the closing body comprises at least one further panic latch lock (49) and/or at least one further bolt lock operatively coupled with the locking fitting (18).

26. The closing body according to claim 1, wherein the closing body comprises a further valve flap (32).

27. The closing body according to claim 26, wherein the further valve flap (32)

is arranged separately in a further opening of a door leaf (12), or is arranged as a cascaded valve flap in an opening which is arranged in the valve flap (32).

28. A closing fitting set for mounting on a door leaf (12) of a pivotable door (11) or a pivotable window or a pivotable closure, comprising:

a locking fitting (18) for mounting on the door leaf (12), wherein the locking fitting (18) is a door lock (20) with an actuating pawl (22), wherein the locking fitting (18) includes a first latch (21) which holds the door leaf (12) in a closed state relative to a frame, wherein the door lock (20) is a panic lock (24) which can be opened from one side at any time in order to release an escape route, wherein the first latch (21) is a component of the panic lock (24);

a thrust rod (39') moved in correspondence with a retraction movement of the first latch (21) of the locking fitting (18) and/or moved in correspondence with a movement of the actuating pawl (22) or a pawl receptacle (42) of the locking fitting (18);

an additional latch, which is formed as a panic latch lock (38) with a lock case (63) and a thrust body (39);

a coupling mechanism (40) for connecting the thrust body (39) to the thrust rod (39'); and a valve device (28) which is designed as a valve flap (32) and can be inserted in an opening (30) of the door leaf (12); and an additional closing device (50) adapted to drive the valve flap (32) from an open position, in which an opening width is greater than zero and less than a residual opening threshold, to a closed position, wherein, within an intended assembly, a release mechanism (42) is formed by the connection of the thrust body (39) and thrust rod (39'), the release mechanism (42) being operatively coupled to the locking fitting (18) and configured to open the valve device (28), so that the valve device (28) effects a temporary pressure equalization when the door leaf is opened if there is a pressure difference over an interior and an exterior of the door leaf.

* * * * *